United States Patent
Rasband et al.

(10) Patent No.: US 9,106,320 B1
(45) Date of Patent: Aug. 11, 2015

(54) NODE SYNCHRONIZATION IN A FREQUENCY HOPPING WIRELESS NETWORK

(71) Applicants: Paul B. Rasband, Lantana, FL (US); Craig E. Trivelpiece, Las Vegas, NV (US)

(72) Inventors: Paul B. Rasband, Lantana, FL (US); Craig E. Trivelpiece, Las Vegas, NV (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 14/276,257

(22) Filed: May 13, 2014

(51) Int. Cl.
*H04B 1/713* (2011.01)
*H04B 1/7156* (2011.01)

(52) U.S. Cl.
CPC ................... *H04B 1/7156* (2013.01)

(58) Field of Classification Search
CPC ...... H04B 1/69; H04B 1/6904; H04B 1/6908; H04B 1/713; H04B 1/7136; H04B 1/7143; H04B 1/715; H04B 1/7156; H04B 1/71563; H04B 1/71566; H04B 2201/73; H04B 2201/71323; H04B 2201/71353; H04B 2201/71361
USPC ......... 375/130, 132, 133, 134, 135, 136, 137, 375/295, 316
See application file for complete search history.

(56) References Cited

U.S. PATENT DOCUMENTS

| 8,351,369 | B2 | 1/2013 | Han et al. | |
| 8,879,604 | B2 * | 11/2014 | Woo et al. | 375/133 |
| 8,989,211 | B2 * | 3/2015 | Jeong et al. | 370/458 |
| 2006/0029061 | A1 | 2/2006 | Pister et al. | |
| 2007/0258508 | A1 * | 11/2007 | Werb et al. | 375/140 |
| 2010/0034159 | A1 * | 2/2010 | Shin et al. | 370/329 |
| 2010/0034239 | A1 * | 2/2010 | Keshavarzian et al. | 375/134 |
| 2013/0242905 | A1 * | 9/2013 | Rasband et al. | 370/329 |
| 2013/0243038 | A1 * | 9/2013 | Rasband et al. | 375/133 |
| 2014/0029567 | A1 * | 1/2014 | Grady | 370/330 |

* cited by examiner

*Primary Examiner* — Siu Lee
(74) *Attorney, Agent, or Firm* — Robert J. Sacco, Esq.; Carol E. Thorstad-Forsyth, Esq.; Fox Rothschild LLP

(57) ABSTRACT

Method for synchronizing a node in a frequency hopping network includes monitoring a hop frequency channel to detect a hop announcement transmitted on a group of control channels in use by a network coordinator node. The hop announcement specifies a second hop frequency channel which will be utilized subsequent to a first hop frequency in a hopping sequence. Responsive to receiving the hop announcement a node monitors the second hop frequency to receive a dwell start message. The dwell start message is transmitted from the coordinator node to signal the beginning of a dwell period during which the second hop frequency will be used by the network for communicating data.

16 Claims, 7 Drawing Sheets

FIG. 6

NODE SYNCHRONIZATION IN A FREQUENCY HOPPING WIRELESS NETWORK

BACKGROUND OF THE INVENTION

1. Statement of the Technical Field

The inventive arrangements relate to wireless networks, and more particularly to wireless networks which communicate in accordance with a frequency hopping scheme.

2. Description of the Related Art

Many wireless communications systems use so-called frequency hopping methods to allow communication among nodes in a manner which makes use of a number of communications channels (frequency bands), one at a time, and varying the radio frequency channel in time according to a pre-determined sequence. Usually this channel "hopping" occurs several times (e.g., 3-5 times) per second in accordance with a very regular schedule. The time spent on each radio frequency or channel is defined as the "dwell time" or "dwell time duration" and the extent of this time period is usually held to a constant value.

The value in frequency hopping resides in the fact that (1) it allows systems to spend a minimum of time on any one channel or small number of channels which may be disturbed by electromagnetic noise in the environment, (2) it allows multiple systems to coexist and use a common set of channels, and (3) it provides for additional security, apart from encryption of communicated data. However, in certain types of wireless networks, the nodes which comprise the network sleep for the vast majority of time and have a great difficulty keeping an accurate time clock. An example of such a wireless network is a low-cost low-duty-cycle wireless sensor network. In such networks one great challenge in implementing frequency hopping is providing some mechanism or method by which the various nodes (which are sleeping or inactive much of the time) can maintain channel hop synchronization with other nodes in the network. This problem is made especially difficult where such synchronization is to be maintained without regular messaging among the nodes to achieve timing correction.

There are two common solutions to the problem of maintaining hop synchronization in wireless networks as described herein. According to one approach, each wireless node participating in the network uses a real-time clock and is required to wake up often enough to maintain the accuracy of that clock. The problem with this approach is that the frequency at which the node must wake up for purposes of maintaining synchronization may be so great that it uses over time a significant amount of the limited power resources available at the node. Accordingly, this approach can greatly reduce the battery life of the wireless nodes in the network. An alternative approach to the problem accepts the fact that an inactive or sleeping node will not maintain synchronization. Instead, when a particular node needs to communicate it first scans the network to "re-find" the currently active channel of the network. But this network scanning process can also consume a great deal of power and thus reduce battery life of the battery powered nodes in the network.

SUMMARY OF THE INVENTION

Embodiments of the invention concern a method for controlling a network. Two or more nodes in a network of wireless communication devices use a frequency hopping method for communicating. This technique involves varying an RF carrier wave frequency for communicating data among a set of hop frequency channels in accordance with a frequency hopping sequence. Prior to a network transition time from a first RF carrier wave frequency of the hopping sequence to a second RF carrier wave frequency in the hopping sequence, a hop announcement is transmitted on a selected group of control channels (i.e., carrier wave settings). The hop announcement is transmitted by a network coordinator node and specifies the second RF carrier wave frequency (e.g. the next hop in the sequence). After transmitting the hop announcement and changing its channel to the new channel (carrier wave frequency), the network coordinator node transmits a dwell start message on the second RE frequency to signal the beginning of a dwell period. The dwell period is the period during which the second RF frequency will be used by the network for communicating data among the various nodes, before hopping to the next frequency. After transmitting the dwell start message, the coordinator node listens during the dwell period to receive a message from a subordinate node of the two or more of nodes comprising the network. At the end of the dwell period, a new cycle is started with a new set of hop announcement messages, and a new channel change, and a dwell start message transmission on the new channel. Channel hopping proceeds in this fashion indefinitely.

The invention also concerns a method for establishing hop synchronization in a subordinate node of a frequency hopping network. A subordinate node monitors any one of a plurality of RF hop frequency channels to detect a hop announcement transmitted on a group of control channels in use by a network coordinator node. The hop announcement specifies a second RF carrier wave frequency which will be utilized subsequent to a first RF frequency in the hopping sequence. Responsive to receiving the hop announcement the subordinate node is controlled via its internal software to cause it to monitor the second RF frequency which has been specified by the hop announcement. The process continues by receiving at the subordinate node on the second RF frequency a dwell start message. The dwell start message is transmitted from the coordinator node to signal the beginning of a dwell period during which the second RF frequency will be used by the network for communicating data.

BRIEF DESCRIPTION OF THE DRAWINGS

Embodiments will be described with reference to the following drawing figures, in which like numerals represent like items throughout the figures, and in which:

Figure 6:
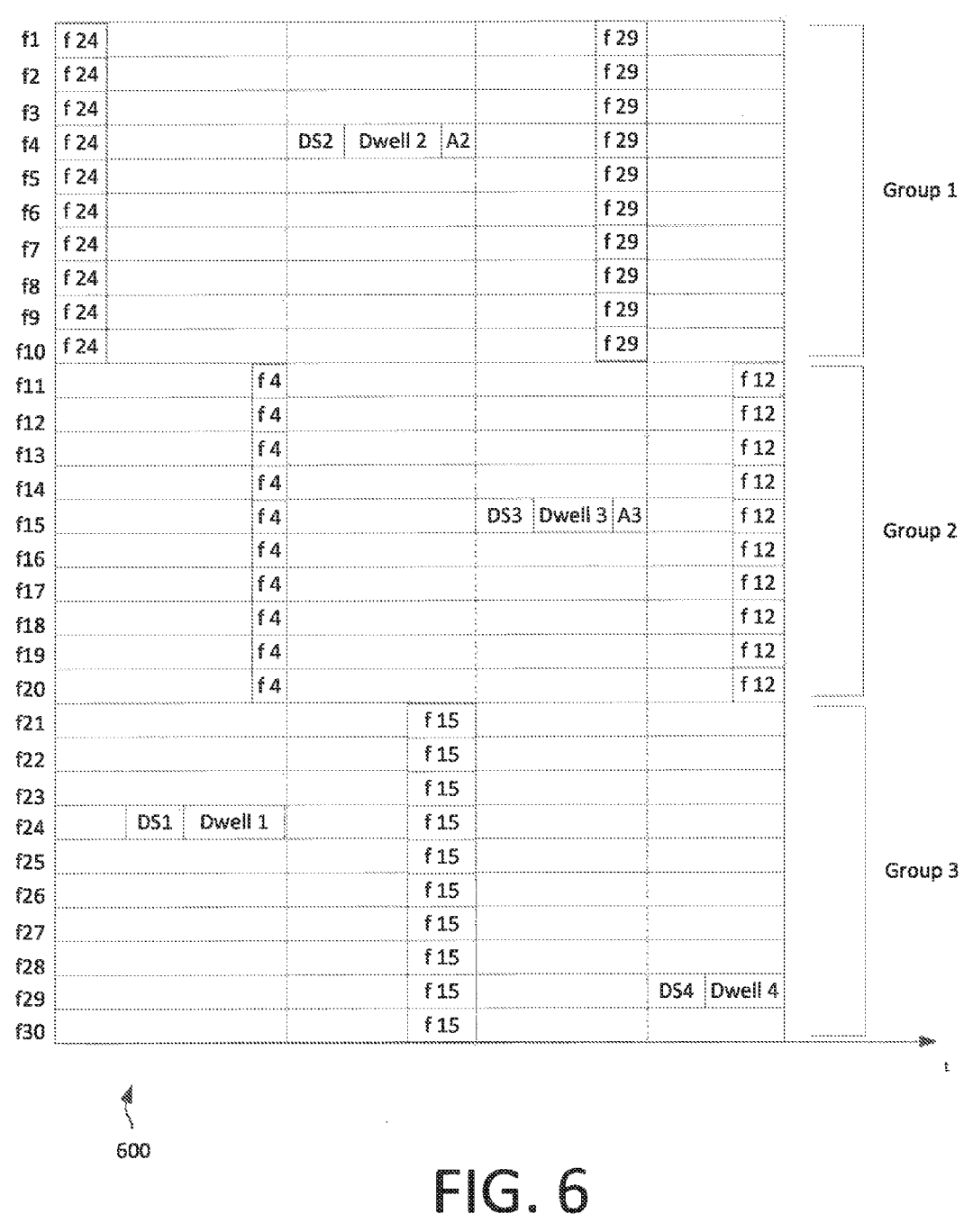

FIG. 6 is a timing diagram that is useful for understanding the method for coordinating frequency hops as described in FIGS. 2-5.

DETAILED DESCRIPTION

Figure 1:
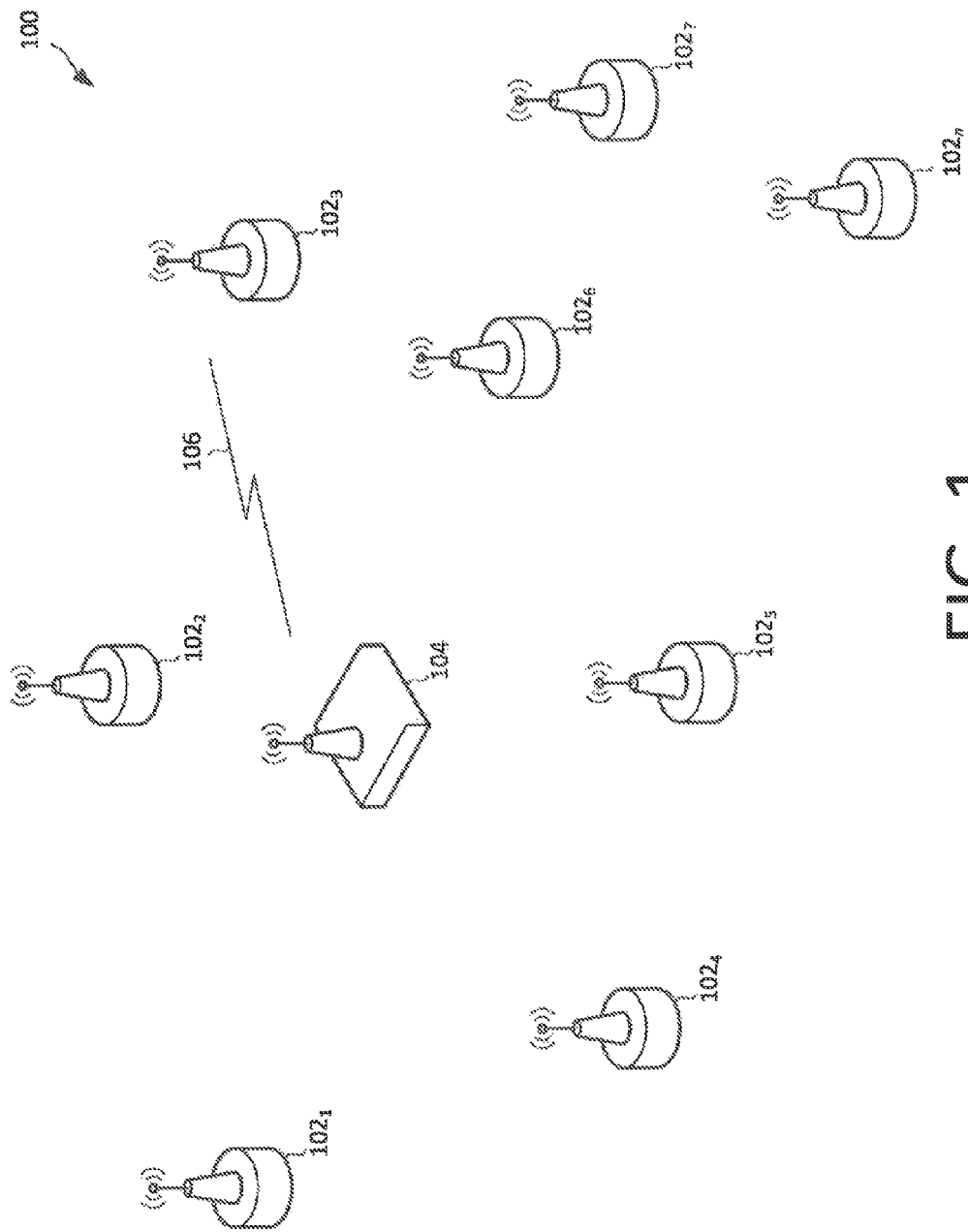
FIG. 1 is drawing that is useful for understanding a wireless frequency hopping network.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Briefly, the invention concerns a frequency hopping network which includes a coordinator node and a plurality of subordinate nodes. The network utilizes variable (and generally very short) channel dwell times as the network hops through a set of hop frequency channels. Prior to each hop, the network coordinator node transmits a brief hop announcement message on a subset of channels selected from the larger set of hop frequency channels. The subset of channels which are selected comprise a set or group of control channels. As an example, in a particular frequency hopping network, 50 hop frequency channels can be provided and a particular control channel set would include 10 channels. Accordingly, there would be five groups of control channels, each having 10 channels.

The hop announcement message contains information which specifies the hop carrier wave frequency (i.e., channel number) corresponding to next dwell time. The network coordinator then hops to the new channel number specified by the announcement message and transmits a second type of message called a dwell start message. The coordinator node then listens on that new channel for a message from any of the various nodes participating in its network. At the end of the dwell period, the coordinator goes through the cycle of steps again (hop announcement message on a (new and different) set of control channels, followed by channel change, followed by dwell start message, followed by brief listen for any message which might arrive on the channel).

If the coordinator node hears the beginning of a message from one of the other nodes during its brief dwell time on a channel, it will, if necessary, extend the dwell time as long as necessary to hear the complete message and send any required response (such as an acknowledgement message). The coordinator node can also initiate messages to other nodes in the network during the dwell time. For purposes of these transmitted messages, it is assumed that the other nodes of the network may be tracking (and synchronized with) network frequency hops as a result of processing hop announcement and dwell start messages. If this assumption cannot be made (e.g., if the intended recipient of the coordinator's outbound message is in all probability sleep), the coordinator will hold the message in its memory, continue channel frequency hopping as described above, and then at a later time when it can be safely assumed that the recipient node is awake (e.g., immediately after the coordinator receives a message from that node), the coordinator will send it outbound message to the recipient node. Generally messaging to and from such nodes is done using message acknowledgement (i.e., reply-after-recipient) to assure message delivery.

When a sleeping subordinate node awakens from a partially inactive state, it will choose one of the hop frequency channels to monitor for an announcement message. The hop frequency channel selected for this purpose is not critical. In order to appreciate why the selected hop frequency channel is not critical, it must be understood that the coordinator node will continually iterate or cycle to a next group or set of hop frequency channels which are momentarily designated as control channels for the duration of a particular hop. For each hop, the coordinator node will broadcast its announcement message on that group of control channels to identify the next or subsequent hop frequency channel that the network will use. Consequently, a subordinate node monitoring a particular hop frequency channel will inevitably hear an announcement message on any hop frequency channel after a predetermined number of network frequency hops. For example, consider a system with 50 hop frequency channels which are organized into 5 control channel groups of 10 channels each. If the network coordinator iteratively selects a different control channel group with each network frequency hop, then the network coordinator will hop (in the worst-case scenario) no more than 5 times before it happens to send a hop announcement on the hop frequency channel being monitored by the subordinate node. The inventive arrangements will now be described in further detail in relation to FIGS. 1-7.

Figure 3:
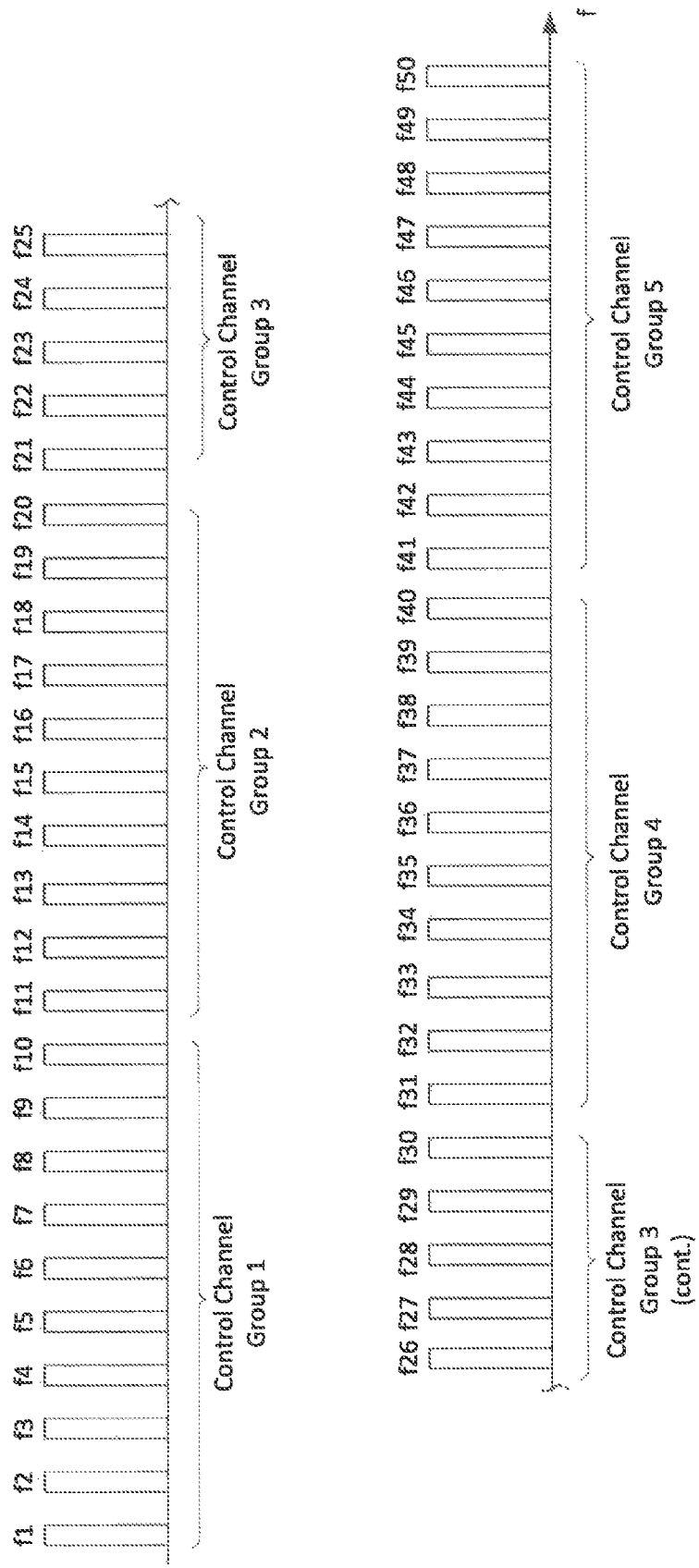
FIG. 3 is a frequency plan that is useful for understanding control frequency groupings in the wireless network of FIG. 1.

Referring now to FIG. 1, there is shown is a wireless network 100 which is comprised of a coordinator node 104 and a plurality of subordinate nodes $102_1, 102_2, 102_3 \ldots 102_n$. The coordinator nodes and the subordinate nodes communicate wirelessly amongst each other using a frequency hopping method. The frequency hopping method generally involves varying an RE carrier wave frequency for communicating data among a set of hop channels in accordance with a frequency hopping sequence. Basic operations of frequency hopping systems are generally well known and therefore will not be described here in detail. Briefly however, in a frequency hopping communication system the radio carrier wave frequency which is used for communicating among the various nodes comprising the network (hereinafter referred to as "the hop frequency") is changed rapidly. The frequency used at any given moment will be a frequency associated with one of the various hop frequency channels assigned to the network. An exemplary set of hop frequency channels is shown in FIG. 3. In the example shown, there are 50 different hop frequency channels which are identified as f1-f50. Each hop frequency channel corresponds to a particular hop frequency which can be used by the network 100 for communicating data. Of course, the invention is not limited to any particular number of hop frequency channels and more or fewer channels can be used.

The time between hops when the hop frequency is not changing is referred to herein as the dwell time duration or simply as the dwell time. This dwell time duration is that length of time during which network communications are conducted among the various nodes of the network on a particular frequency. As explained below in farther detail, the dwell time duration in the network 100 is variable. In the wireless network 100 the hop frequency assigned to each subsequent network hop is generally determined in accordance with a predetermined hop sequence. The hop sequence will specify the sequence of radio frequencies or channels which are to be used for such communications. The sequence can be determined in accordance with a pseudorandom function or by any other means.

Each node of the network 100 will have a sufficient means (e.g. a look-up table or an algorithm) for determining a sequence of subsequent hop frequencies if a current hop frequency of the network is known. However, if the nodes $102_1, 102_2, 102_3 \ldots 102_n$ sleep (operate in a power-saving partially-inactive state) for the vast majority of time, they may have difficulty maintaining a time clock with sufficient accuracy for maintaining hop synchronization with the remainder of the network 100. An example of such a wireless network is a low-cost low-duty-cycle wireless sensor network. Accordingly, some mechanism or method is advantageously provided by which the various nodes $102_1, 102_2, 102_3 \ldots 102_n$ can maintain channel hop synchronization with other nodes in the network.

In the network shown in FIG. 1, channel hop synchronization is maintained using the network coordinator node 104 and a synchronization method as hereinafter described. The network coordinator node can be a node which has special hardware and/or software which is specifically provided to facilitate operation of such node as a network coordinator. Alternatively, one or more of the subordinate nodes $102_1, 102_2, 102_3 \ldots 102_n$ can be designed to optionally function as a coordinator node 104 when selected by the network or an operator for this purpose. The configuration of the nodes as described herein is described in greater detail in relation to FIG. 7.

Figure 2:
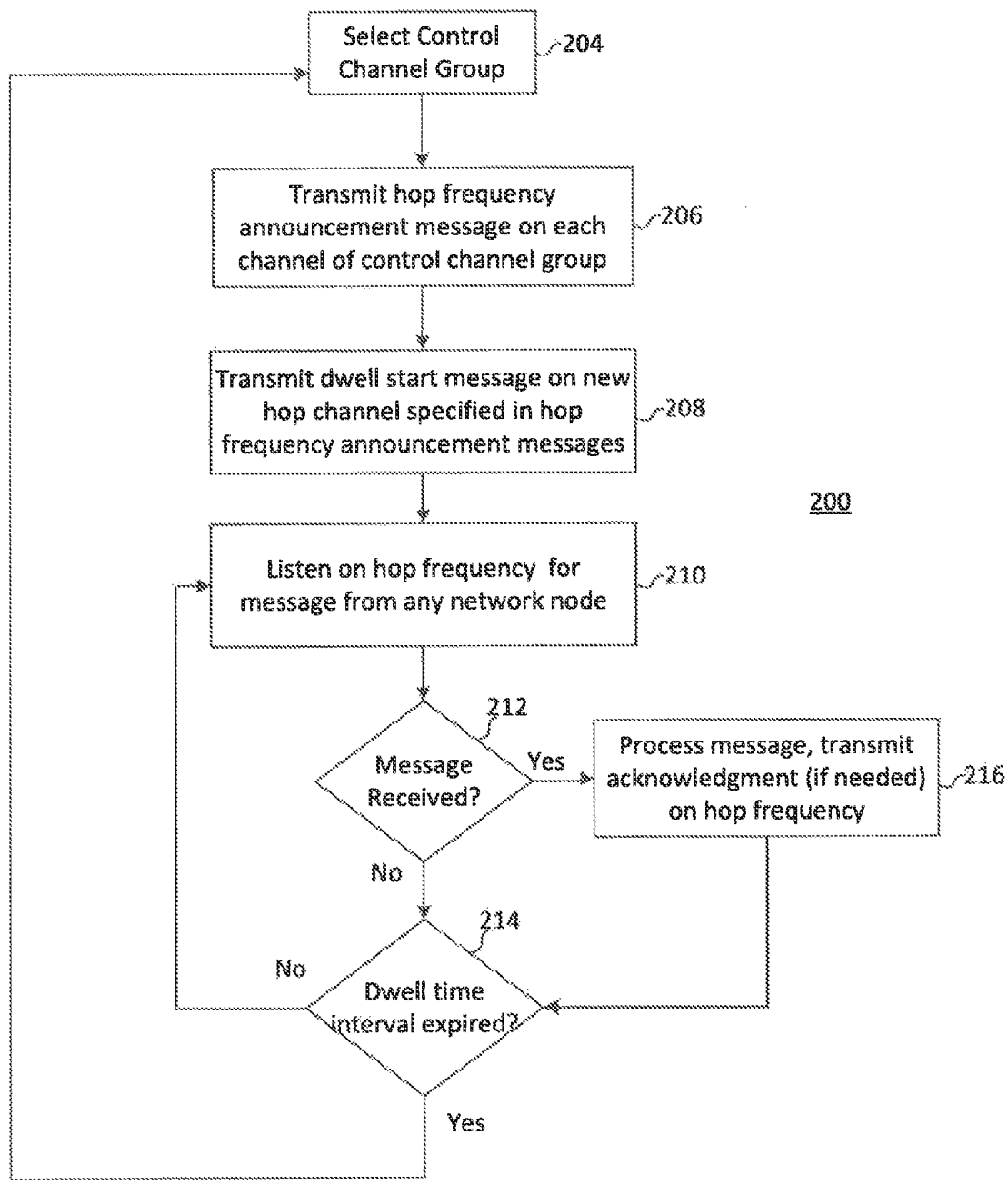
FIG. 2 is a flowchart that is useful for understanding the operation of a coordinating node in the wireless frequency hopping network of FIG. 1.

Referring now to FIG. 2, there is shown a process 200 that is useful for understanding the operation of the coordinator node in the network 100. The process 200 is best understood with reference to FIG. 3, which is a frequency plan, and FIG. 4 which is a timing diagram.

The process 200 begins in step 204 in which a control channel group is selected for the current channel hop. The hop frequency channels in the selected control channel group are those which will be used by the coordinator node for transmitting the announcement message as described above. According to one aspect of the invention, the full set of available hop frequency channels (e.g. 50 channels) is divided into N number of control channel groups. In the exemplary arrangement illustrated in FIG. 3, there are 50 hop frequency channels f1-f50 which are evenly divided into five groups of control channels (N=5). Hop frequency channels f1-f10 are included in control channel group 1, hop frequency channels f11-f20 are included in control channel group 2, hop frequency channels f21-f30 are included in control channel group 3, hop frequency channels 31-40 are included in control channel group 4, and hop frequency channels 41-50 are included in control channel group 5. In this exemplary embodiment, each of the five control channel groups or sets includes 10 hop frequency channels. Of course, the number of hop frequency channels in each control channel group can be larger or smaller than those shown in FIG. 3. For example, the number of hop frequency channels can range from relatively few (e.g. 10 or 25) to more than 1000.

Similarly, the number of hop frequency channels allocated to each control channel group can vary depending on the particular system and its requirements. The number of control channels in each control channel group is preferably made sufficiently large so as to minimize the time it takes for the coordinator node 104 to cycle through all of the N control channel groups. Including larger numbers of hop frequency channels in each control group will necessarily result in a smaller number of control channel groups that the coordinator node must cycle through. Conversely, consideration must be given to the transmitter limitations of the coordinator node 104. If an excessively large number of hop frequency channels are included in each control group, it may result in an excessive fraction of total network time being dedicated to control channel messaging, and a correspondingly small fraction of total network time being used for channel dwell during which the network conducts its application-oriented messaging. The value of N and the assignment of hop frequency channels to each control group can be set by a system administrator. Alternatively, the value of N can be automatically selected by the coordinator node 104 in an optional step (not shown).

Figure 4:
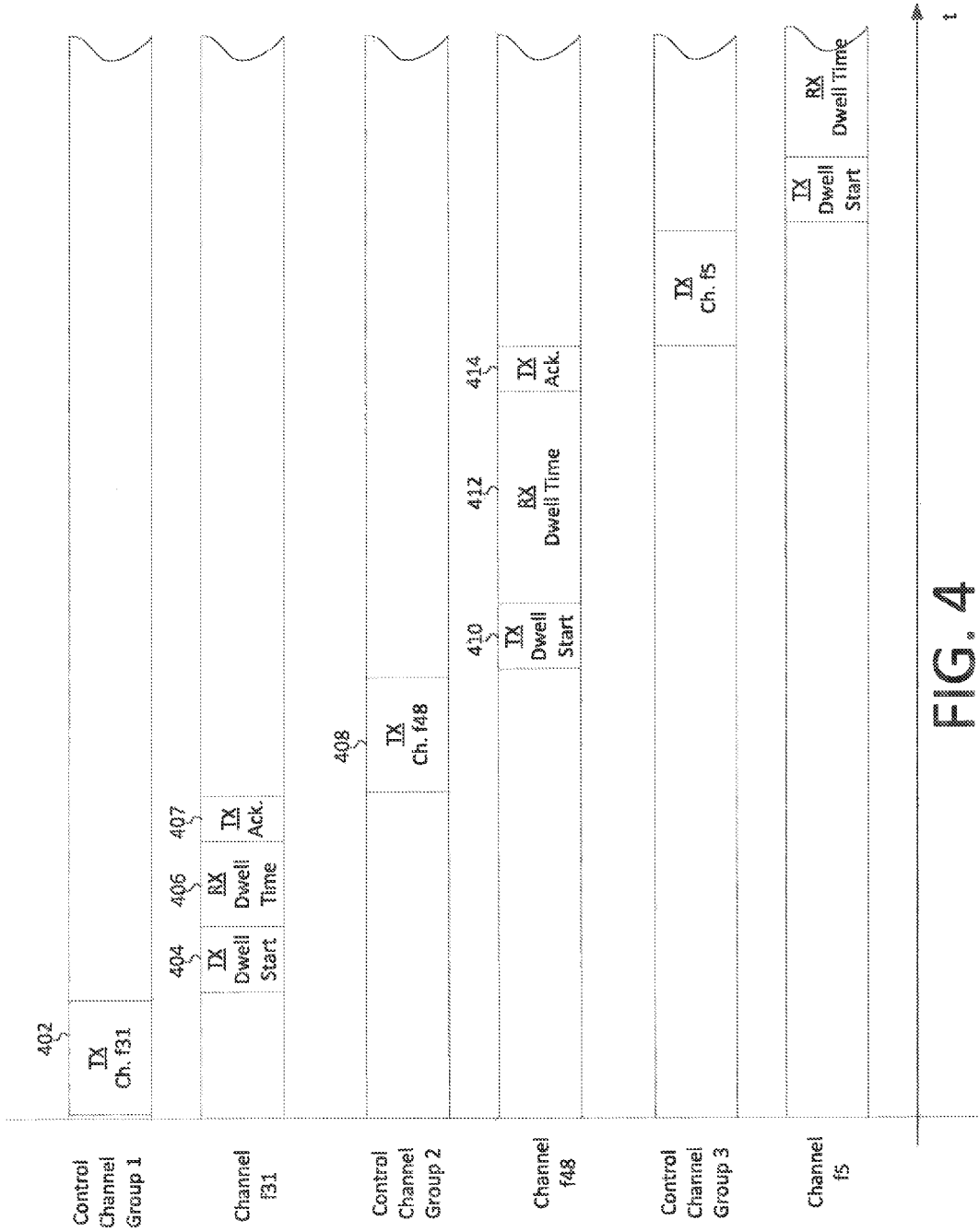
FIG. 4 is a timing diagram that is useful for understanding the operations of a network coordinating node.

Once a control channel group has been selected at 204, the coordinator node proceeds in step 206 to transmit a hop frequency announcement message on all of the control channels comprising the selected control channel group. This step is illustrated in FIG. 4 which shows that a hop frequency announcement message 402 is transmitted on control channel group 1. The announcement message indicates that the next hop frequency channel is f31.

The exact format of the announcement message 402 is not critical, provided that it specifies the hop frequency channel number (or equivalent data) for the hop frequency channel which will be used by the network in a subsequent hop. In a preferred embodiment the announcement message 402 will specify the hop frequency which will be used by the network 100 in the next hop immediately following the one in which the announcement message is transmitted.

After transmitting the hop frequency announcement message 402, the coordinator node proceeds at 208 to transmit a dwell start message. The dwell start message is transmitted on the hop frequency channel previously specified in the announcement message for that hop. To illustrate this step, FIG. 4 shows that a dwell start message 404 is transmitted on hop frequency channel f31. Note that channel f31 is the hop frequency channel which was previously specified in the announcement message 402. The exact format of the dwell start message is not critical provided that it sufficient to allow a node $102_1, 102_2, 102_3 \ldots 102_n$ receiving such message to mark the beginning of a dwell time duration for that particular hop.

After transmitting the dwell start message, the coordinator node in step 210 monitors the current hop frequency channel as specified for a particular hop. More particularly, the coordinator node 104 listens or receives on the hop frequency channel during a dwell time duration. This concept is illustrated in FIG. 4 which shows that the coordinator node monitors hop frequency channel f31 during a dwell time 406. The coordinator node listens on hop frequency channel f31 for the occurrence of a data message (e.g. data message 106) from one of the subordinate nodes $102_1, 102_2, 102_3 \ldots 102_n$ comprising the network 100. Any suitable message format can be used for wirelessly communicating the data message 106. Alternatively, the coordinator node 104 can use the available dwell time duration to transmit a data message to one or more of the subordinate nodes which is maintaining frequency hop synchronization with the network 100 by monitoring the announcement and dwell start messages as described herein.

The coordinator monitors to determine where a message has been received on the hop channel (step 212), and also monitors time to determine whether the dwell time interval has expired (step 214). If any message is received (212:Yes) it is processed (step 216). As an example of the implementation of step 214, the coordinator node can initiate a timer when the dwell start message is first transmitted and can then track the amount of elapsed time. If the dwell time duration has not expired (214: No) then the process continues to step 210 where the dwell time for the particular frequency hop is continued. The coordinator continues to check for received messages and for the expiration of the dwell time in this way until the dwell time duration is determined to have expired (214:Yes). Note that because step 212 occurs prior to step 214 and always executes step 216 in the yes condition, the net effect of the particular arrangement and sequencing of steps 212, 214, and 216 is that whenever a message appears it is processed, and any acknowledgement messages sent to the originating network node prior to declaring an end to the channel dwell (214:Yes) This results in a small-to-moderate extension of the actual dwell time on the hop channel, but guarantees that the hop to the next channel does not occur inconveniently in the middle of a message exchange with a particular network node.

With the foregoing arrangement, the total duration of the dwell time for a particular frequency hop is made variable. This concept is illustrated in FIG. 4 which shows that a dwell time 412 can be of different duration as compared to a second dwell time 406. A minimum time value can be initially set for the dwell time duration at step 214. Such minimum time will be chosen to be sufficient to at least determine whether a message is being received (or sent) at the coordinator node. Thereafter, this minimum predetermined dwell time duration can be automatically extended to accommodate longer length messaging. The variable duration dwell time duration feature is advantageous as it facilitates rapid transition to the next hop frequency when there is no messaging. This ensures that a subordinate node $102_1, 102_2, 102_3 \ldots 102_n$ that has just awakened from its inactive state will more quickly become synchronized with the network 100 using the methods described herein.

In an exemplary arrangement, if group i is selected in step 204 for the current hop, then group i−1 was used for the previous hop and group i+1 will be used for the next hop (if i is equal to 5, then i+1 is equal to 1). Since all hop frequency channels are included in a control channel group, and each only once, then it must be true that on average each channel will be used for the same amount of time in channel control (i.e., transmission of hop announcements prior to a channel hop). This simple iterative approach to cycling through the designated control channel groups is satisfactory for most purposes. However, the invention is not limited in this regard and other means can also be used for selecting the next control channel group. Still, it is preferable for the selection of control channel groups to be performed in a way that ensures that each hop frequency channel will be used the same amount of time in channel control.

In one particular embodiment the control channel group may be comprised of the most recently used hop channels (for example, most recent four channels), as well as the current channel. For example if the network is currently on channel 17, and prior to this the network was on channels 3, 25, 1, 44, 6, and 34 (in that order, with channel 34 being used immediately prior to channel 17), then the current control group of four control channels would be 17, 34, 6, and 44. Immediately prior to hopping from the channel 17 dwell to a new channel (say, channel 8), the coordinator would transmit a hop announcement message on those control channels (i.e., 17, 34, 6, and 44). On the next cycle (after the dwell on channel 8), the control group would become 8, 17, 34, and 6 with channel 44 having been dropped from the control channel group. This "trailing control channel group" method has the great advantage that, if a subordinate node is trying to track the network and happens to miss one or two hop announcement messages on its current channel, it still has a good chance of ultimately catching a hop announcement message before its current channel falls off the list. In the above example it would take four consecutive misses of the hop announcement before a tracking subordinate node's current channel was dropped from the list of control channels. This makes it possible to implement very robust and trackable networks with good control channel use efficiency and short average network acquisition times.

At step 206 coordinator node transmits a hop frequency, announcement message on the hop frequency channels associated with the selected control channel group. For example, in FIG. 4, it is shown that the coordinator node transmits a hop frequency announcement message 408 which specifies that hop frequency channel f48 is the next hop frequency. Next, the coordinator node transmits a dwell start message 410 on hop frequency channel f48, followed by a dwell time 412 on hop frequency channel f48 during which messages can be received (or transmitted), and concluding with an acknowledgment message 414. Thereafter, it can be observed in FIG. 4 that control channel group 3 is selected and an announcement message specifies that the next hop frequency channel is f5.

From the foregoing discussion and from FIG. 3 it will be appreciated that the various groups of control channels are selected from among the hop frequency channels. In general, each control channel group will contain two or more of the hop frequency channels as shown. It will further be appreciated that a particular control channel group used for broadcasting an announcement message during a particular dwell time is selected from among two or more of groups of control channels as shown in FIG. 3. The control channel group used during a particular hop can be iteratively selected from among the two or more of groups of control channels, or can be selected by other means (e.g. randomly).

Figure 5:
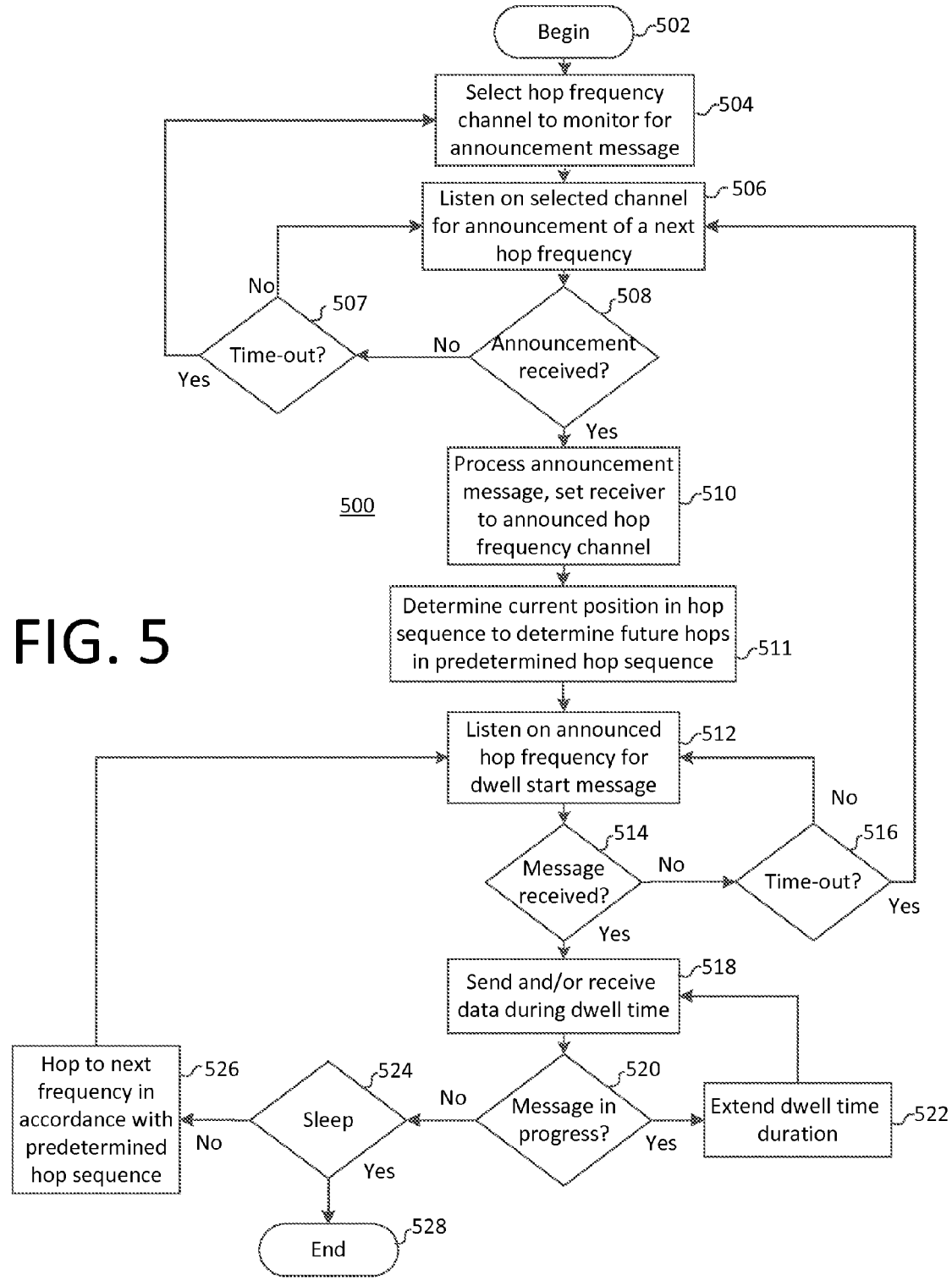
FIG. 5 is a flowchart that is useful for understanding a method for coordinating frequency hops in a subordinate node in the wireless frequency hopping network of FIG. 1.

Referring now to FIG. 5, a flowchart 500 is provided which is useful for understanding a process performed by a subordinate node $102_1, 102_2, 102_3 \ldots 102_n$. The process begins at 502 and continues on to step 504 where one of the hop frequency channels is selected for monitoring. The purpose of such monitoring is to listen for a hop frequency announcement from a coordinator node 104. As explained above, each channel will be used on average for the same amount of time in channel control (i.e., transmission of hop announcements messages prior to a channel hop). Accordingly, the particular hop frequency chosen by the subordinate node for monitoring is not critical and any suitable method can be used to select a channel to monitor for this purpose. In this regard, the hop frequency channel can be selected randomly, iteratively, or by some alternative means as described below.

Once the hop frequency channel has been selected in step 504, the subordinate node begins to monitor transmissions on the selected channel to detect the presence of an announcement message. At 508 the subordinate node checks to determine if an announcement message has been received. If not (508: No), then the subordinate node returns to 506 and continues monitoring on the selected hop frequency channel. Step 507 can optionally be provided for situations where no announcement message is received on the selected hop frequency after a predetermined time. Step 507 can be useful in the event that RF interference or other communication conditions prevent receipt of an announcement message on a particular hop frequency channel. After a time-out period has expired in step 507, the process can return to step 504 to select a new hop frequency channel before continuing.

After some time (which will not exceed N hops) a determination will be made at 508 that an announcement message has been received (508: Yes). When this occurs, the subordinate node will at step 510 extract information from the announcement message indicating a hop frequency channel and set its receiver to the specified hop frequency channel. In step 511, the subordinate node can use the announced hop frequency to determine the current position of the network in relation to a known frequency hop sequence. For example, assume that the subordinate node has stored information which specifies that the hop sequence for the network is . . .

f17, f31, f22, f9, f40, f37, f3, f22, f6 . . . and the announcement message specifies that the next hop is f31. Based on the information specifying the next hop frequency channel, the subordinate node will also be able to predict all subsequent hops which are in the known or predetermined hop sequence. In a preferred embodiment, the announcement message will specify the network hop frequency channel which immediately follows the current hop frequency channel in a frequency hopping sequence. This arrangement will facilitate the fastest possible synchronization of the subordinate node with the hopping sequence. However, the invention is not limited in this regard and the hop frequency channel specified by the announcement message can also be one or more hops later in the hopping sequence. This delay can be useful to allow the subordinate node sufficient time to process the announcement message and then transition its receiver to the specified hop frequency channel.

The process will continue at 512 where the subordinate node will begin listening or monitoring the announced hop frequency channel to detect the presence of a dwell start message transmitted from the coordinator node. The subordinate node will continue to monitor the announced hop frequency to determine at 514 when a dwell start message has been received. When a dwell start message is received (514: Yes) it will serve as a timing synchronization signal for the subordinate node which indicates the beginning of the dwell time duration for the current frequency hop. A time-out check can optionally be provided at 516 which will cause the process to return to step 506 if a dwell start message is not received after some period of time. This will cause the subordinate node to acquire an updated announcement message at 506 and then continue as previously described.

It should be appreciated that in some embodiments the dwell start message may be omitted, and the actual time of dwelling on the new channel implied by timing information given in the hop announcements, or explicitly stated in the hop announcements (e.g., dwell starts in "x" number of milliseconds, where "x" is given in each hop announcement to accurately reflect the amount of time remaining before the transmission of the all hop announcements is complete and the new channel dwell begins).

After a dwell start message is received at 514, the process will continue on to step 518 where a data message can be transmitted by the subordinate node. The data message can be directed to the coordinator node 104 or one of the other subordinate nodes $102_1, 102_2, 102_3 \ldots 102_n$. Optionally, message data can also be received by the subordinate node during a dwell time duration associated with the current hop. For example, the received message data can include an acknowledgment message from another node confirming that a transmitted message has been received. Other message data can also be optionally received during this time.

At 520 a determination is made as to whether a message is currently being received or transmitted. If so (520: Yes), then a dwell time duration will be extended by a predetermined amount in step 522 and the subordinate node will continue receiving at 518. If no message is currently being received or transmitted (520: No) then the process will determine at 524 whether the node is to return to its inactive or sleep state. If not (524: No) then the process will continue on to step 526 and move to the next hop frequency in accordance with the predetermined hop sequence. This step can now be accomplished without receiving further hop frequency announcement messages because the node has established at 511 the current position of the network in relation to the hop sequence. If the subordinate node has no further messages and sleep mode is appropriate (524: Yes) then the process ends at step 528.

It will be appreciated that one or more of the subordinate nodes $102_1, 102_2, 102_3 \ldots 102_n$ can be inactive or in sleep-mode for the vast majority of time in order to limit power consumption. As such, these nodes may power down certain node sub-systems (such as a radio receiver and/or transmitter) to reduce the power consumed by the node. Such subordinate nodes can awake and actively participate in communications only when necessary for data communication or other housekeeping tasks. When a particular subordinate node is active, the previously powered down sub-systems can be powered-up and the system becomes fully functional again. The control over these operations can be managed by an on-board microprocessor or controller. In some scenarios, the node can be arranged to power up when a sensor detects a variation or some other activity in a monitored environment.

In the exemplary wireless network 100 as described herein a plurality of nodes $102_1, 102_2, 102_3 \ldots 102_n$ can comprise sensors of some type. Such nodes often do not have any data to communicate for long periods of time and therefore transition to a sleep state during such periods. Such nodes can have difficulty maintaining channel hop synchronization with other nodes communicating in the network due to such long periods of inactivity. The inventive arrangements described herein can advantageously provide a means by which inactive nodes can power up and quickly become synchronized with the frequency hopping sequence.

When any subordinate node $102_1, 101_2, 102_3 \ldots 102_n$ wants to send a message to the coordinator node 104, it must find/track the network 100 and capture a dwell start announcement, after which it can send its message to the coordinator node. In order for the coordinator node to send a message to a subordinate node, it must either (1) assume the other node is tracking the network (in which case it may simply send the message during the dwell time duration, or (2) wait for the other node to send some sort of "keep alive", "heartbeat; or "checking for messages" message. Two subordinate nodes $102_1, 102_2, 102_3 \ldots 102_n$ can communicate directly with each other, without going through the coordinator node or any other intermediary node, if both those subordinate nodes are tracking the network 100 at the same time (each assuming so of the other). This is done by waiting for the dwell start message on the current hop channel, followed by the originating node commencing transmission of the message which directly addresses the recipient node.

It should be noted that the frequency hopping method described herein does not require an exact adherence to any particular hopping schedule. Accordingly, exact and predictable dwell times are not needed. It is thus a flexible scheme which allows for long dwell times/long messages when needed, but otherwise relies on short dwell times and convenient control channel group sizes (i.e. a convenient number of hop frequency channels included per group). This approach results in the shortest possible network acquisition time (on an average basis) for subordinate nodes $102_1, 102_2, 102_3 \ldots 102_n$ which must sleep for very long times and cannot practically track the network 100 or predict its channel hops while asleep.

The methods described herein specifically include embodiments in which subordinate nodes are assigned particular hop frequency channels for use as acquisition channels (i.e. assigned channels which they will monitor for hop announcement messages). This allows the subordinate nodes $102_1, 102_2, 102_3 \ldots 102_n$ to be divided into sets, which may be advantageous for optimizing network bandwidth usage in cases where some subordinate nodes have a higher priority than others. For example, a network 100 could include two types of subordinate nodes—one of a high priority and one of a low priority. In such a scenario, all of the low priority subordinate nodes can be assigned acquisition channels which are associated with a limited number of control channel groups (e.g. control channel group 5), while the high priority subordinate nodes can be evenly split among a greater number of control channel groups (control channel groups 1-4).

In a network in which listen-before-talk methods are being used (which is usually the case), network traffic will be significantly lighter during channel dwell times following hop announcement messages sent over control channel groups 1-4. For a more concrete illustration, suppose the network consists of 100 nodes (4 nodes high priority, and 96 nodes low priority). Suppose all of these nodes have very low duty cycle and thus must acquire the network from scratch (i.e., using control channels) prior to each message exchange. If the 4 high-priority nodes are each assigned to control channel groups 1, 2, 3, or 4 (one on each, for instance), and if the other 96 low-priority nodes are all assigned to control channel group 5, then clearly the messages initiated from the high-priority nodes will have a much better chance of being transmitted without multiple failures and re-sends/re-tries. The low priority nodes will be competing all with each other (every fifth hop) for a chance to send their respective messages. During busy network periods this could result in message delay from those low priority nodes. Note also that a node may be in a low priority mode in certain circumstances (e.g., when sending simple housekeeping messages), but switch to a high priority mode when in a different set of circumstances (e.g., when in an alarm state).

In some embodiments of the invention, the announcement message described herein can contain additional data beyond simply identifying the next hop frequency. For example, in networks that can utilize various different hop sequences, the announcement message can specify a particular hop sequence in use. The announcement message could also specify other information that is useful for subordinate nodes. For example, if a coordinator node 104 has determined that RF interference on a particular hop frequency channel is excessive, then that channel can be omitted from a predetermined hopping sequence. Hop frequency channels omitted from a predetermined hopping sequence can be identified in the announcement message.

Figure 7:
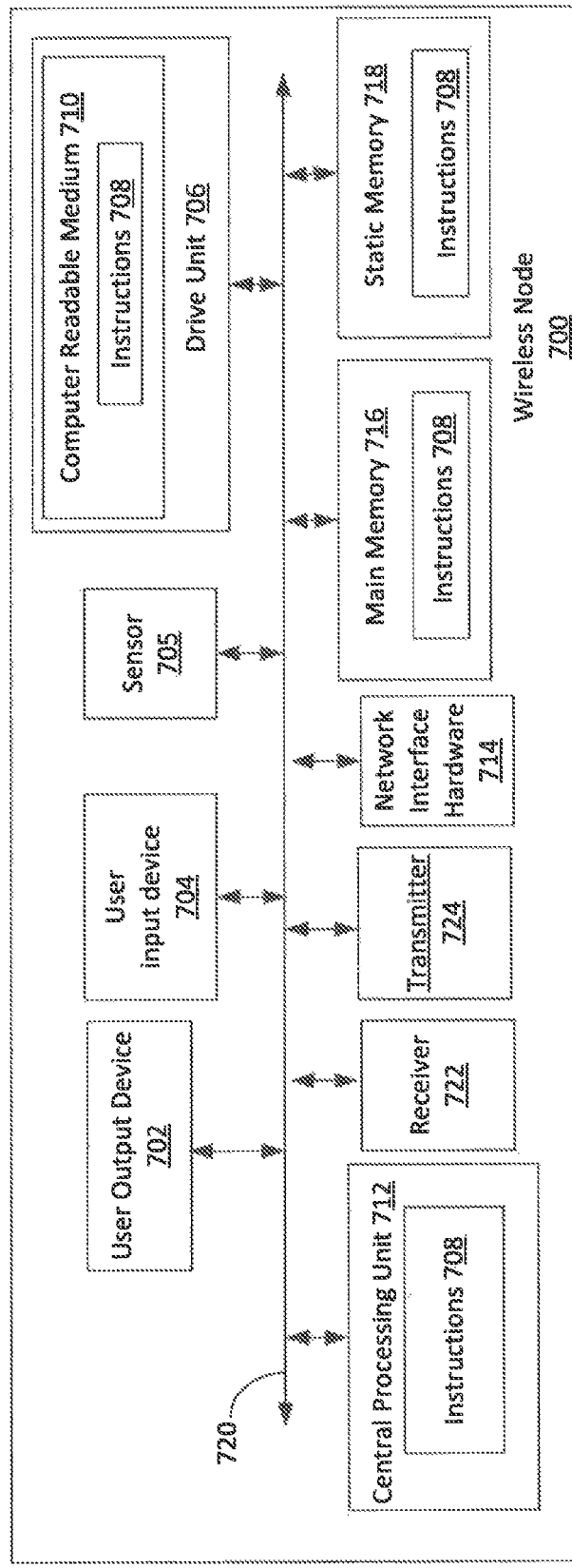
FIG. 7 is a drawing that is useful for understanding an exemplary wireless node of the wireless frequency hopping network in FIG. 1.

Referring now to FIG. 7 there is shown a drawing that is useful for understanding an exemplary wireless node 700. A coordinator node 104 and a subordinate node 102₁, 102₂, 102₃ ... 102ₙ can each have an architecture and arrangement similar to the wireless node 700 as hereinafter described. The wireless node 700 can include a central processing unit 712, a main memory 716, and a static memory 718, which communicate with each other via system bus 720. Wireless node 700 can also include a transmitter 724 through which radio frequency signals may be transmitted, and a receiver through which radio frequency signals can be received. According to a preferred embodiment, the wireless node 700 includes a transceiver in place of the receiver and transmitter, where the transceiver operates as both a transmitter and receiver.

One or more user input devices 704 can be included in the wireless node 700, such as a keypad and/or cursor control device. A user output device 702, such as a display screen or status indicator light(s)s can be used to communicate information to the user concerning the operations and status of the wireless node 700. User input devices 704 and user output devices 702 can communicate with the central processing unit through a system bus, but may also be connected by other interface and bus structures. Optional user network interface hardware 714 can facilitate data communication operations with other data processing equipment to which the wireless node device is connected by wired or wireless means. However, in certain embodiments, these functions can instead be performed by the central processing unit 712.

A drive unit 706 includes a computer-readable storage medium 710 on which is stored one or more sets of instructions 708 (e.g., software code) configured to implement one or more of the methodologies, procedures, or functions described herein. The instructions 708 can also reside, completely or at least partially, within the main memory 716, the static memory 718, and/or within the central processing unit 712 during execution thereof by the wireless node 700. The main memory 716 and the central processing unit 712 also can constitute machine-readable media.

The term "computer-readable storage medium" shall be understood to include any non-transient medium that is capable of storing a set of instructions for execution by the machine and that cause the machine to perform any one or more of the methodologies of the present disclosure. The term "computer-readable medium" shall accordingly be taken to include, but not be limited to, solid-state memories such as a memory card or other package that houses one or more read-only (non-volatile) memories, random access memories, or other re-writable (volatile) memories. Accordingly, the disclosure is considered to include a computer-readable medium as listed herein and to include recognized equivalents and successor media, in which the software implementations herein are stored. Those skilled in the art will appreciate that the device architecture illustrated in FIG. 7 is one possible example of a wireless node. However, the invention is not limited in this regard and any other suitable computing device architecture can also be used without limitation.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations. In accordance with various embodiments of the present invention, the methods described below are stored as software programs in a computer-readable storage medium and are configured for running on a computer processor.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A method for controlling a network, comprising:
   communicating among a plurality of nodes in a network of wireless communication devices using a frequency hopping method by varying a Radio Frequency ("RF") carrier wave frequency for said communicating among a set of hop frequency channels in accordance with a frequency hopping sequence;

prior to a network transition time from a first RF carrier wave frequency of said frequency hopping sequence to a second RF carrier wave frequency in said frequency hopping sequence, selecting a first group of control channels from a plurality of control channel groups, where said plurality of control channel groups comprise the same channels as the set of hop frequency channels, and each said control channel group comprises hop frequency channels that are different as compared to that contained in all other ones of said plurality of control channel groups;

transmitting, by a coordinator node, a first hop announcement on the first group of control channels, said first hop announcement specifying the second RF carrier wave frequency;

beginning a dwell time duration at a time specified by the coordinator node during which the second RF carrier wave frequency will be used by the network for said communicating; and receiving at said coordinator node during said dwell time duration a message from a subordinate node of said plurality of nodes;

wherein the coordinator node continually and iteratively cycles though said plurality of control channel groups such that a different one of the control channel groups is selected with each network frequency hop.

2. The method according to claim 1, further comprising determining the second RF carrier wave frequency at the subordinate node by receiving said hop announcement.

3. The method according to claim 2, further comprising determining at the subordinate node said beginning of the dwell time duration based on dwell start message received from the coordinator node.

4. The method according to claim 3, further comprising transmitting said data message from said subordinate node to said coordinator node during said dwell time duration.

5. The method according to claim 2, further comprising determining at the subordinate node at least a third RF carrier wave frequency of the frequency hopping sequence subsequent to the second RF carrier wave frequency exclusive of receiving a hop announcement of said third RF carrier wave frequency.

6. The method according to claim 2, further comprising determining at the subordinate node at least a third RF carrier wave frequency of the frequency hopping sequence subsequent to the second RF carrier wave frequency based on information stored at said subordinate node which specifies the frequency hopping sequence.

7. The method according to claim 6, further comprising automatically transitioning at the subordinate node from the second RF carrier wave frequency to the third RF carrier wave frequency responsive to expiration of a predetermined time period corresponding to said dwell time duration.

8. The method according to claim 7, further comprising automatically extending said predetermined time duration when needed to facilitate receiving of said message in its entirety.

9. The method according to claim 1, further comprising dynamically selecting said hop frequency channels of said first group of control channels to include those RF carrier wave frequencies which have been most recently used for communicating in accordance with the frequency hopping sequence.

10. A method for establishing hop synchronization in a frequency hopping network, comprising:

communicating among a plurality of nodes in a network of wireless communication devices using a frequency hopping method by varying an RF carrier wave frequency for said communicating among a set of hop frequency channels in accordance with a frequency hopping sequence;

monitoring at a subordinate node of said plurality of nodes any one of the plurality of RF hop frequency channels to detect a hop announcement transmitted on a first group of control channels in use by a network coordinator node, said hop announcement specifying a second RF carrier wave frequency which will be utilized subsequent to a first RF carrier wave frequency in the hopping sequence;

responsive to receiving the hop announcement, controlling the subordinate node to cause it to monitor the second RE carrier wave frequency;

receiving by the subordinate node on the second RE carrier wave frequency a dwell start message from the coordinator node to signal the beginning of a dwell time duration during which the second RF carrier wave frequency will be used by the network for said communicating;

wherein the first group of control channels was selected from a plurality of control channel groups, said plurality of control channel groups comprise the same channels as the set of hop frequency channels, and each said control channel group comprises hop frequency channels that are different as compared to that contained in all other ones of said plurality of control channel groups; and wherein the coordinator node continually and iteratively cycle through said plurality of control channel groups such that a different one of the control channel groups is selected with each network frequency hop.

11. The method according to claim 10, further comprising after receiving said dwell start message, transmitting to said coordinator node during said dwell time duration a message from the subordinate node.

12. The method according to claim 10, further comprising determining at the subordinate node at least a third RF carrier wave frequency of the hopping sequence subsequent to the second RF frequency exclusive of receiving a hop announcement of said third RE carrier wave frequency.

13. The method according to claim 12, wherein said third RE carrier wave frequency is determined based on information stored at said subordinate node which specifies the hopping sequence.

14. The method according to claim 12, further comprising automatically transitioning at the subordinate node from the second RE carrier wave frequency to the third RE carrier wave frequency responsive to expiration of a predetermined time duration corresponding to said dwell time duration.

15. The method according to claim 14, further comprising automatically extending said predetermined time duration at said subordinate node when needed to facilitate receiving of said message in its entirety.

16. The method according to claim 10, further comprising dynamically selecting said hop frequency channels of said first group of control channels to include those RF carrier wave frequencies which have been most recently used for communicating in accordance with the frequency hopping sequence.

* * * * *